United States Patent

Lyons

[11] Patent Number: 5,986,552
[45] Date of Patent: Nov. 16, 1999

[54] FISH BITE DETECTING AND WARNING DEVICE

[76] Inventor: Robert L. Lyons, 1309 W. Main St., Grafton, W. Va. 26354

[21] Appl. No.: 09/133,456

[22] Filed: Aug. 13, 1998

[51] Int. Cl.⁶ .................................................. G08B 23/00
[52] U.S. Cl. ................... 340/573.2; 340/668; 340/691.5; 340/693.5; 340/693.9; 43/17
[58] Field of Search ............................. 340/573.2, 693.5, 340/693.9, 665, 668, 691.5; 43/17

[56] References Cited

U.S. PATENT DOCUMENTS

| | | | |
|---|---|---|---|
| 4,811,512 | 3/1989 | Amos | 43/17 |
| 5,058,308 | 10/1991 | Girard | 43/17 |
| 5,185,949 | 2/1993 | Patterson | 43/17 |
| 5,501,027 | 3/1996 | Acker | 43/17 |

Primary Examiner—Thomas Mullen

[57] ABSTRACT

A fish bite detecting and warning device for alerting a fisher when a fish has been hooked on a fishing line. The device includes a housing with a downwardly extending support shaft for insertion into the ground. The housing has at least one elongate slot therethrough. At least one primary switch is provided in the housing. The primary switch has a pivoting actuating arm which is extended through the slot of the housing. The actuating arm is pivotable between a raised position and a lowered position and is biased towards the lowered position. An outwardly extending guide member is located beneath the slot. The guide member has a plurality of grooves for receiving the fishing line looped beneath the adjacent actuating arm. A computer processor for generating signals is located in the housing and is electrically connected to the primary switch. An alerting light source is provided in the housing and electrically connected to the computer processor. A speaker for generating sounds is mounted to the housing and is electrically connected to computer processor.

11 Claims, 2 Drawing Sheets

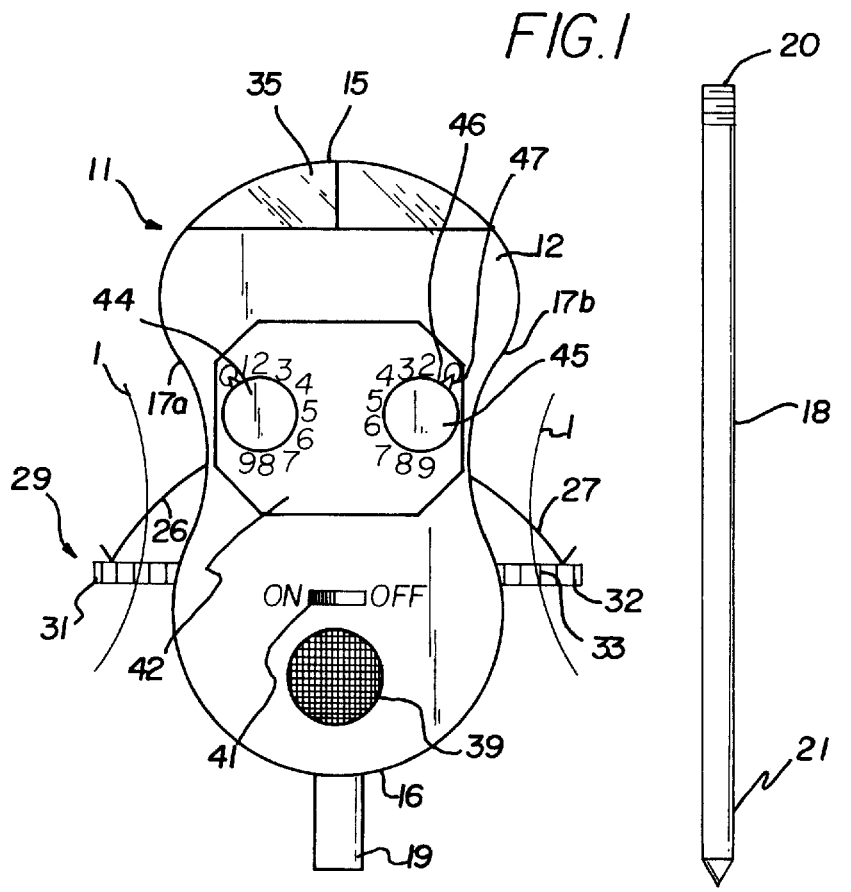
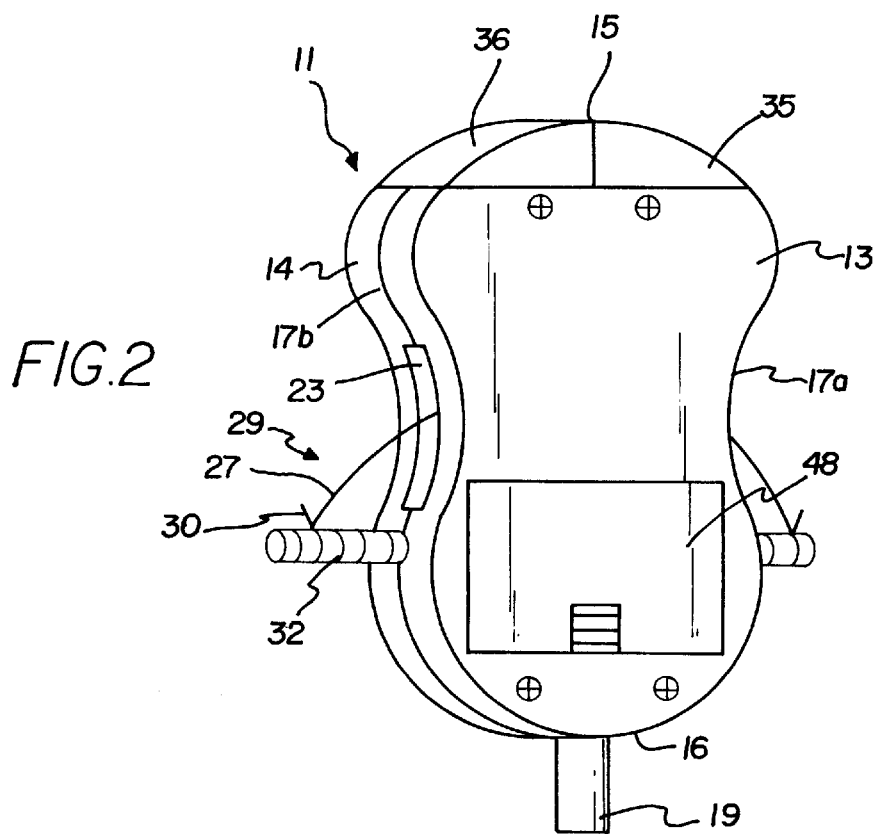

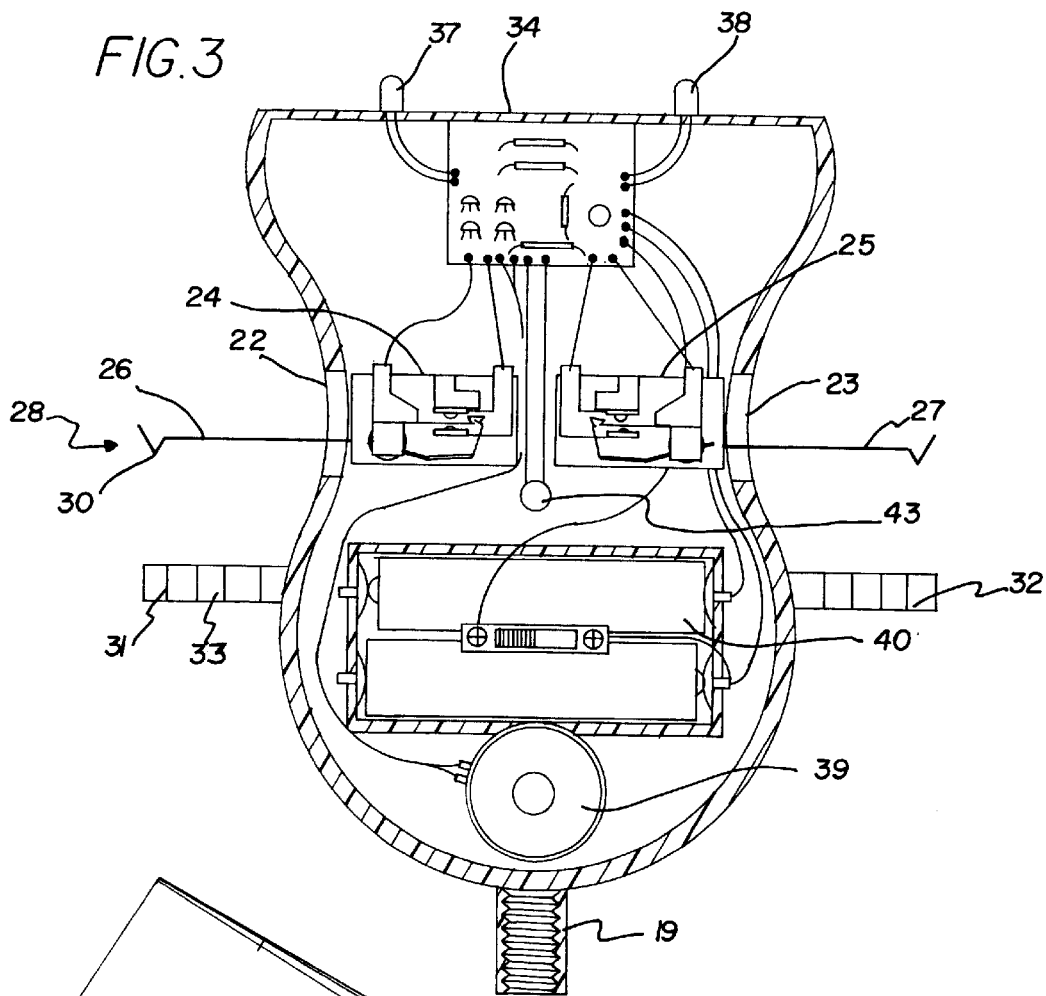
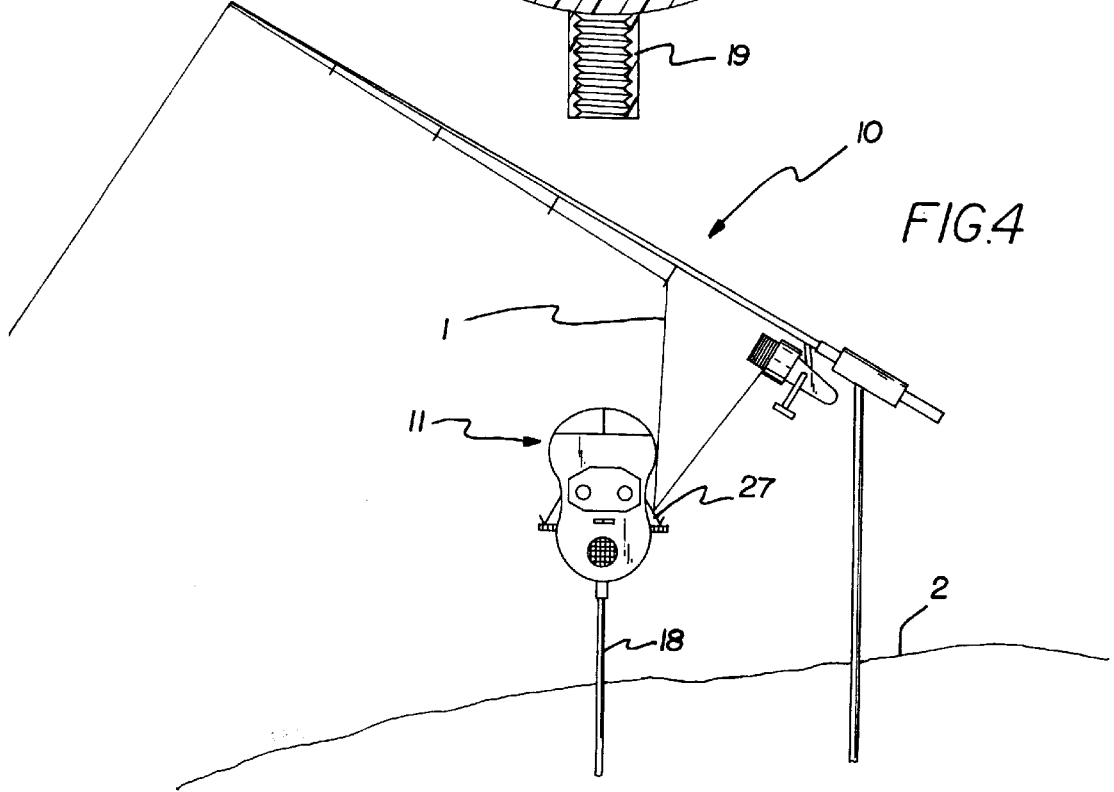

FISH BITE DETECTING AND WARNING DEVICE

BACKGROUND OF THE INVENTION

1. Field of the Invention

The present invention relates to fishing accessories and more particularly pertains to a new fish bite detecting and warning device for alerting a fisher when a fish has been hooked on a fishing line.

2. Description of the Prior Art

The use of fishing accessories is known in the prior art. More specifically, fishing accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,471,555; U.S. Pat. No. 4,447,979; U.S. Pat. No. Des. 294,853; U.S. Pat. No. 4,506,468; U.S. Pat. No. 4,586,284; U.S. Pat. No. 4,905,398; U.S. Pat. No. 5,321,391; U.S. Pat. No. 5,261,180; U.S. Pat. No. 5,199,361; U.S. Pat. No. 5,058,308; U.S. Pat. No. 4,794,719; U.S. Pat. No. 4,656,774; U.S. Pat. No. 3,798,630; U.S. Pat. No. 3,702,513; and UK Patent No. GB 2 248 755 A (inventor: Jurgen Fechner).

While these devices fulfill their respective, particular objectives and requirements, the aforementioned patents do not disclose a new fish bite detecting and warning device. The inventive device includes a housing with a downwardly extending support shaft for insertion into the ground. The housing has at least one elongate slot therethrough. At least one primary switch is provided in the housing. The primary switch has a pivoting actuating arm which is extended through the slot of the housing. The actuating arm is pivotable between a raised position and a lowered position and is biased towards the lowered position. An outwardly extending guide member is located beneath the slot. The guide member has a plurality of grooves for receiving the fishing line looped beneath the adjacent actuating arm. A computer processor for generating signals is located in the housing and is electrically connected to the primary switch. An alerting light source is provided in the housing and electrically connected to the computer processor. A speaker for generating sounds is mounted to the housing and is electrically connected to computer processor.

In these respects, the fish bite detecting and warning device according to the present invention substantially departs from the conventional concepts and designs of the prior art, and in so doing provides an apparatus primarily developed for the purpose of alerting a fisher when a fish has been hooked on a fishing line.

SUMMARY OF THE INVENTION

In view of the foregoing disadvantages inherent in the known types of fishing accessories now present in the prior art, the present invention provides a new fish bite detecting and warning device construction wherein the same can be utilized for alerting a fisher when a fish has been hooked on a fishing line.

The general purpose of the present invention, which will be described subsequently in greater detail, is to provide a new fish bite detecting and warning device apparatus and method which has many of the advantages of the fishing accessories mentioned heretofore and many novel features that result in a new fish bite detecting and warning device which is not anticipated, rendered obvious, suggested, or even implied by any of the prior art fishing accessories, either alone or in any combination thereof.

To attain this, the present invention generally comprises a housing with a downwardly extending support shaft for insertion into the ground. The housing has at least one elongate slot therethrough. At least one primary switch is provided in the housing. The primary switch has a pivoting actuating arm which is extended through the slot of the housing. The actuating arm is pivotable between a raised position and a lowered position and is biased towards the lowered position. An outwardly extending guide member is located beneath the slot. The guide member has a plurality of grooves for receiving the fishing line looped beneath the adjacent actuating arm. A computer processor for generating signals is located in the housing and is electrically connected to the primary switch. An alerting light source is provided in the housing and electrically connected to the computer processor. A speaker for generating sounds is mounted to the housing and is electrically connected to computer processor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish bite detecting and warning device apparatus and method which has many of the advantages of the fishing accessories mentioned heretofore and many novel features that result in a new fish bite detecting and warning device which is not anticipated, rendered obvious, suggested, or even implied by any of the prior art fishing accessories, either alone or in any combination thereof.

It is another object of the present invention to provide a new fish bite detecting and warning device which may be easily and efficiently manufactured and marketed.

It is a further object of the present invention to provide a new fish bite detecting and warning device which is of a durable and reliable construction.

An even further object of the present invention is to provide a new fish bite detecting and warning device which is susceptible of a low cost of manufacture with regard to both materials and labor, and which accordingly is then susceptible of low prices of sale to the consuming public, thereby making such fish bite detecting and warning device economically available to the buying public.

Still yet another object of the present invention is to provide a new fish bite detecting and warning device which provides in the apparatuses and methods of the prior art some of the advantages thereof, while simultaneously overcoming some of the disadvantages normally associated therewith.

Still another object of the present invention is to provide a new fish bite detecting and warning device for alerting a fisher when a fish has been hooked on a fishing line.

Yet another object of the present invention is to provide a new fish bite detecting and warning device which includes a housing with a downwardly extending support shaft for insertion into the ground. The housing has at least one elongate slot therethrough. At least one primary switch is provided in the housing. The primary switch has a pivoting actuating arm which is extended through the slot of the housing. The actuating arm is pivotable between a raised position and a lowered position and is biased towards the lowered position. An outwardly extending guide member is located beneath the slot. The guide member has a plurality of grooves for receiving the fishing line looped beneath the adjacent actuating arm. A computer processor for generating signals is located in the housing and is electrically connected to the primary switch. An alerting light source is provided in the housing and electrically connected to the computer processor. A speaker for generating sounds is mounted to the housing and is electrically connected to computer processor.

Still yet another object of the present invention is to provide a new fish bite detecting and warning device that provides an audible and visual warning to a fisher of a fish strike. This way the fisher does not always have to watch the fishing line.

Even still yet another object of the present invention is to provide a new fish bite detecting and warning device may be used with two fishing lines and is able to indicate to a user which line a fish has bitten.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front side view of a new fish bite detecting and warning device with the shaft detached from the housing according to the present invention.

FIG. 2 is a schematic back side view of the present invention.

FIG. 3 is a schematic cross sectional view of the interior of the housing of the present invention.

FIG. 4 is a schematic side view of the present invention in use.

DESCRIPTION OF THE PREFERRED EMBODIMENT

With reference now to the drawings, and in particular to FIGS. 1 through 4 thereof, a new fish bite detecting and warning device embodying the principles and concepts of the present invention and generally designated by the reference numeral 10 will be described.

As best illustrated in FIGS. 1 through 4, the fish bite detecting and warning device 10 generally comprises a housing 11 with a downwardly extending support shaft 18 for insertion into the ground 2. The housing 11 has at least one elongate slot 22, 23 therethrough. At least one primary switch 24, 25 is provided in the housing 11. The primary switch 24, 25 has a pivoting actuating arm 26, 27 which is extended through the slot 22, 23 of the housing 11. The actuating arm 26, 27 is pivotable between a raised position 28 and a lowered position 29 and is biased towards the lowered position 29. In use, the actuating arm 26, 27 is designed for looping a fishing line 1 beneath it such that when a fish is hooked on the fishing line 1 the fish pulls the fishing line 1 to raise the actuating arm 26, 27 from the lowered position 29 to the raised position 28. An outwardly extending guide member 31, 32 is located beneath the slot 22, 23. The guide member 31, 32 has a plurality of grooves 33 for receiving the fishing line 1 looped beneath the adjacent actuating arm 26, 27. A computer processor 34 for generating signals is located in the housing 11 and is electrically connected to the primary switch 24, 25. An alerting light source 37, 38 is provided in the housing 11 and electrically connected to the computer processor 34. In use, pivoting of the actuating arm 26, 27 of the primary switch 24, 25 from the lowered position 29 to the raised position 28 generates a signal from the computer processor 34 for illuminating the alerting light source 37, 38. A speaker 39 for generating sounds is mounted to the housing 11 and is electrically connected to computer processor 34. In use, pivoting of the actuating arm 26, 27 from the lowered position 29 to the raised position 28 generates a signal from the computer processor 34 for producing an audible sound from the speaker 39.

In use, the device 10 is designed for alerting a user when a fish has been hooked on a fishing line 1 by the pulling of the fishing line by the fish. Specifically, the device 10 includes a housing 11 having front and back faces 12, 13, and a perimeter side wall 14 between the front and back faces 12, 13 extending around the perimeters of the front and back faces 12, 13. The perimeter side wall 14 of the housing 11 has top and bottom regions 15, 16, and a pair of side regions 17a, 17b. Ideally, the housing 11 has a generally figure-eight shaped configuration. In this ideal embodiment, the housing 11 may also have separable front and back portions that can be detached from one another to permit servicing of items inside the housing 11. The housing 11 has a thickness defined between the front and back faces 12, 13 of the housing 11, a height defined between the top and bottom regions 15, 16 of the housing 11 and a maximum width defined between the side regions 17a,b of the housing 11. In an ideal illustrative embodiment, the thickness of the housing 11 is about 1½ inches, the length of the housing 11 is about 7 inches, and the maximum width of the housing 11 is about 3½ inches.

A support shaft 18 is downwardly extended from bottom region 16 of the housing 11. In use, the support shaft 18 is designed for inserting into the ground 2 to support the housing 11 above the ground 2. Preferably, the bottom region 16 of the housing 11 has a threaded attachment stem 19 while the support shaft 18 has a threaded upper end 20 and a pointed lower end 21. The threaded upper end 20 of the support shaft 18 is threadably inserted into the threaded attachment stem 19 of the bottom region 16 of the housing 11 so that the support shaft 18 is detachable from the housing 11. The pointed lower end 21 of the support shaft 18 is designed for inserting into the ground 2. The attachment stem has a length extending from bottom region 16 of the housing 11. In the ideal illustrative embodiment, the length of the attachment stem is about 1½ inches. The support shaft 18 is generally cylindrical and has a length defined between the upper and lower ends 20, 21 of the support shaft 18. The length of the support shaft 18 is preferably greater than about 12 inches and ideally about 16 inches.

Each of the side regions 17a,b of the housing 11 has an elongate slot 22, 23 therethrough. The slots 22, 23 of the side regions 17a,b each have a longitudinal axis extending in a direction between the top and bottom regions 15, 16 of the housing 11.

A pair of primary switches 24, 25 are provided in the housing 11. Each of the primary switches 24, 25 has a pivoting actuating arm 26, 27. The actuating arm 26 of a first of the primary switches 24 is outwardly extended through the slot 22 of one of the side regions 17a of the housing 11 and the actuating arm 27 of a second of the primary switches 25 is outwardly extended from the slot 23 of another of the side regions 17b of the housing 11. Each of the actuating arms 26, 27 is pivotable between a raised position 28 (FIG. 3) and a lowered position 29 (FIG. 1). Each of the primary switches preferably completes a circuit when the associated actuating arm 26, 27 is in the raised position. The actuating arms 26, 27 extend in an upwards direction when in the raised position 28 and extend in a downwards direction when in the lowered position 29. Each of the actuating arms 26, 27 is biased towards the respective lowered position 29. Preferably, a spring biases each actuating arm 26, 27 towards the respective lowered position 29. Ideally, the switches are spring loaded contact switches using a leaf spring to bias the actuating arms 26, 27 to the lowered position 29. In the ideal illustrative embodiment, at least about 10 grams of weight is needed to counter the biasing force.

In use, each of the actuating arms 26, 27 is adapted for looping a fishing line 1 therebeneath such that when a fish is hooked on the fishing line 1, the fish pulls the fishing line 1 to raise the actuating arm from the lowered position 29 to the raised position 28. Each of the actuating arms 26, 27 preferably has a bent free end 30 distal the housing 11 designed for helping hold the fishing line 1 looped under the respective actuating arm 26, 27.

Each of the side regions 17a,b of the housing 11 has an outwardly extending guide member 31, 32 located beneath the slot 22, 23 of the respective side region 17a,b. Each of the guide embers 31, 32 has a plurality of grooves 33 extending generally parallel to the longitudinal axis of the adjacent slot 22, 23. In use, he grooves 33 are designed for receiving the fishing line 1 looped beneath the adjacent actuating arm 26, 27 to help hold the fishing line 1 beneath the actuating arm.

The top region 15 of the housing 11 preferably has a pair of generally translucent lens portions 35, 36 for permitting the passage of light therethrough. The lens portions 35, 36 are preferably separable from the rest of the housing 11. Ideally, each of the lens portions 35, 36 is colored a distinct color from one another, for example: one may be colored blue and one may be colored red. A pair of alerting light sources 37, 38 are provided in the housing 11. A first of the alerting light sources 37 is positioned in a first of the lens portions 35 and a second of the alerting light sources 38 is positioned in a second of the lens portions 36.

A computer processor 34 for generating signals is located in the housing 11. Each of the primary switches 24, 25 is electrically connected to the computer processor 34. Each of the alerting light sources 37, 38 is electrically connected to the computer processor 34. In use, pivoting of the actuating arm 26 of the first primary switch 24 from the lowered position 29 to the raised position 28 generates a signal from the computer processor 34 for illuminating the first alerting light source 37. Similarly, pivoting of the actuating arm 27 of the second primary switch 25 from the lowered position 29 to the raised position 28 generates a signal from the computer processor 34 for illuminating the second alerting light source 38. Additionally, a speaker 39 for generating sounds is mounted to the front face 12 of the housing 11 and is electrically connected to computer processor 34. In use, pivoting of either of the actuating arms 26, 27 from the lowered position 29 to the raised position 28 generates a signal from the computer processor 34 for producing an audible sound (such as a buzzer) from the speaker 39. Preferably, the computer processor 34 also has a timer for measuring a predetermined amount of time after the computer processor 34 has generated a signal to the alerting light sources 37, 38 and speaker 39. The timer has a switch for deactivating the signals to the alerting light sources 37, 38 and the speaker 39 after the predetermined amount of time has elapsed from the initial generation of the signal by the computer processor 34. Preferably, the predetermined amount of time is greater than about 2 seconds. Even more preferably, the predetermined amount of time is about 3 seconds. In the ideal embodiment, the predetermined amount of time is about 15 seconds.

A power source 40 is provided in the housing 11 and electrically connected to the computer processor 34. Ideally, the power source 40 comprises a battery power source 40 such as a pair of AA batteries. The back face 13 of the housing 11 preferably has an access panel 48 for providing a closable opening into the housing 11 to permit access to the power source 40. A master switch 41 is mounted to the front face 12 of the housing 11 and electrically connected to the computer processor 34. The master switch 41 permits selective activation and deactivation (i.e., turning on and off) of the computer processor 34 by a user.

In the preferred embodiment, the front face 12 of the housing 11 has a window 42 therethrough for permitting passage of light therethrough. Ideally, the window 42 has a generally octagonal outer perimeter and is generally amber in color. An indicator light source 43 for indicating when the computer processor 34 is activated is provided in the housing 11 and electrically connected to the computer processor 34. The indicator light 43 is positioned adjacent the window 42. The indicator light 43 is electrically connected to the master switch 41 such that the indicator light is illuminated when the computer processor 34 is activated and is off when the computer processor 34 is deactivated by the master switch 41.

Preferably, the amount of biasing force biasing each actuating arm 26, 27 is selectively adjustable to permit increasing and decreasing of the biasing force by a user.

Ideally, each of the primary switches 24, 25 has a rotatably mounted tension dial 44, 45 for selectively adjusting the amount of biasing force biasing the associated actuating arm 26, 27 towards the respective lowered position 29. The tension dials 44, 45 extending from the front face 12 of the housing 11 and is located on the window 42. The window 42 preferably has indicia 46 around each of the tension dials 44, 45 calibrated to indicate various amounts of biasing force against the actuating arm 26, 27. Each of the tension dials 44, 45 has a pointer 47 to point at the indicia 46 to indicate the amount of biasing force on the actuating arm 26, 27.

In use, a user sticks the shaft into the ground near a body of water to support the housing above the ground. Fishing lines may then be cast into the water and then each looped beneath either of the actuating arms. When a fish bites on a fishing line, the tug on the line by the fish raises the actuating arm to activate the associated alerting light the speaker to alert the fisher of a bite on the fishing line. Preferably, the reel of the fishing line is left open so that the fish does not realize that it has be detected by letting the line freely unravel off the reel. The actuating arm lets the line unravel freely while the pull of the fish still lifts the actuating arm to the raised position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the cope of the invention.

I claim:

1. A device for alerting a user when a fish has been hooked on a fishing line, said device comprising:
   a housing;
   a support shaft for insertion into the ground being downwardly extended from said housing;
   said housing having at least one elongate slot therethrough;
   at least one primary switch being provided in said housing, said primary switch having a pivoting actuating arm, said actuating arm of said primary switch being extended through the slot of said housing;
   said actuating arm being pivotable between a raised position and a lowered position;
   said actuating arm being biased towards the lowered position;
   said actuating arm being adapted for looping a fishing line therebeneath such that when a fish is hooked on the fishing line the fish pulls the fishing line to raise the actuating arm from the lowered position to the raised position;
   said housing having an outwardly extending guide member located beneath the slot, said guide member having a plurality of grooves for receiving the fishing line looped beneath the adjacent actuating arm;
   a computer processor for generating signals being located in said housing, said primary switch being electrically connected to said computer processor;
   an alerting light source being provided in said housing and electrically connected to said computer processor, wherein pivoting of said actuating arm of said primary switch from said lowered position to said raised position generates a signal from said computer processor for illuminating said alerting light source;
   a speaker for generating sounds being mounted to said housing and being electrically connected to computer processor; and
   wherein pivoting of said actuating arm from said lowered position to said raised position generates a signal from said computer processor for producing an audible sound from said speaker.

2. The device of claim 1, wherein said housing has front and back faces, and a perimeter side wall between said front and back faces extending around the perimeters of said front and back faces, said perimeter side wall of said housing having top and bottom regions, and a pair of side regions, wherein said housing has a generally figure-eight shaped configuration.

3. The device of claim 2, wherein said housing has a thickness defined between said front and back faces of said housing, a height defined between said top and bottom regions of said housing and a maximum width defined between said side regions of said housing, wherein said thickness of said housing is about 1½ inches, wherein said length of said housing is about 7 inches, and wherein said maximum width of said housing is about 3½ inches.

4. The device of claim 1, wherein said housing has a threaded attachment stem, said support shaft having a threaded upper end and a pointed lower end, said threaded upper end of said support shaft being threadably inserted into said threaded attachment stem of said bottom region of said housing.

5. The device of claim 4, wherein said attachment stem has a length extending from bottom region of said housing, wherein said length of said attachment stem is about 1½ inches, wherein said support shaft has a length defined between said upper and lower ends of said support shaft, said length of said support shaft being greater than about 12 inches.

6. The device of claim 1, wherein said computer processor has a timer for measuring a predetermined amount of time after said computer processor has generated a signal to said alerting light source and said speaker, said timer deactivating said signals to said alerting light source and said speaker after said predetermined amount of time has elapsed from the generation of the signal by said computer processor.

7. The device of claim 6, wherein said predetermined amount of time is greater than about 2 seconds.

8. The device of claim 1, wherein a power source is provided in said housing and electrically connected to said computer processor.

9. The device of claim 1, wherein the amount of biasing force biasing said actuating arm is selectively adjustable to permit increasing and decreasing of the biasing force by a user.

10. The device of claim 9, wherein said primary switch has a rotatably mounted tension dial for selectively adjusting the amount of biasing force biasing the actuating arm towards the lowered position.

11. A device for alerting a user when a fish has been hooked on a fishing line, said device comprising:

a housing having front and back faces, and a perimeter side wall between said front and back faces extending around the perimeters of said front and back faces, said perimeter side wall of said housing having top and bottom regions, and a pair of side regions, wherein said housing has a generally figure-eight shaped configuration;

said housing having a thickness defined between said front and back faces of said housing, a height defined between said top and bottom regions of said housing and a maximum width defined between said side regions of said housing;

wherein said thickness of said housing is about 1½ inches, wherein said length of said housing is about 7 inches, and wherein said maximum width of said housing is about 3½ inches;

a support shaft being downwardly extended from bottom region of said housing;

said bottom region of said housing having a threaded attachment stem, said support shaft having a threaded upper end and a pointed lower end, said threaded upper end of said support shaft being threadably inserted into said threaded attachment stem of said bottom region of said housing;

wherein said attachment stem has a length extending from bottom region of said housing, wherein said length of said attachment stem is about 1½ inches;

wherein said support shaft is generally cylindrical and has a length defined between said upper and lower ends of said support shaft, said length of said support shaft being greater than about 12 inches;

each of said side regions of said housing having an elongate slot therethrough, said slots of said side regions having a longitudinal axis extending in a direction between said top and bottom regions of said housing;

a pair of primary switches being provided in said housing, each of said primary switches having a pivoting actuating arm, the actuating arm of a first of said primary switches being extended through the slot of one of said side regions of said housing, the actuating arm of a second of said primary switches being extended through the slot of another of said side regions of said housing;

each of said actuating arms being pivotable between a raised position and a lowered position, said actuating arms extending in an upwards direction when in said raised position, said actuating arms extending in a downwards direction when in said lowered position;

each of said actuating arms being biased towards the respective lowered position, wherein a spring biases each actuating arm towards the respective lowered position;

each of said actuating arms being adapted for looping a fishing line therebeneath such that when a fish is hooked on the fishing line the fish pulls the fishing line to raise the actuating arm from the lowered position to the raised position, each of said actuating arms having a bent free end, said bent free end being for helping hold a fishing line looped under the respective actuating arm;

each of said side regions of said housing having an outwardly extending guide member located beneath the slot of the respective side region, each of said guide members having a plurality of grooves for receiving the fishing line looped beneath the adjacent actuating arm;

a computer processor for generating signals being located in said housing, each of said primary switches being electrically connected to said computer processor;

said top region of said housing having a pair of generally translucent lens portions for permitting the passage of light therethrough, each of said lens portions being colored a distinct color from one another;

a pair of alerting light sources being provided in said housing, each of said alerting light sources being electrically connected to said computer processor, a first of said alerting light sources being positioned in a first of said lens portions, a second of said alerting light sources being positioned in a second of said lens portions;

wherein pivoting of said actuating arm of said first primary switch from said lowered position to said raised position generates a signal from said computer processor for illuminating said first alerting light source;

wherein pivoting of said actuating arm of said second primary switch from said lowered position to said raised position generates a signal from said computer processor for illuminating said second alerting light source;

a speaker for generating sounds being mounted to said front face of said housing and being electrically connected to computer processor;

wherein pivoting of either of said actuating arms from said lowered position to said raised position generates a signal from said computer processor for producing an audible sound from said speaker;

said computer processor having a timer for measuring a predetermined amount of time after said computer processor has generated a signal to said alerting light sources and speaker, said timer deactivating said signals to said alerting light sources and said speaker after said predetermined amount of time has elapsed from the generation of the signal by said computer processor, wherein said predetermined amount of time is greater than about 2 seconds;

a power source being provided in said housing and electrically connected to said computer processor, wherein said power source comprises a battery power source;

said back face of said housing having an access panel for providing a closable opening into said housing to permit access to said power source;

a master switch being mounted to said front face of said housing and electrically connected to said computer processor, said master switch permitting selective activation and deactivation of said computer processor by a user;

said front face of said housing having a window therethrough for permitting passage of light therethrough, wherein said window has a generally octagonal outer perimeter;

an indicator light source being provided in said housing and electrically connected to said computer processor, said indicator light being positioned adjacent said window; and wherein the amount of biasing force biasing each actuating arm is selectively adjustable to permit increasing and decreasing of the biasing force by a user, each of said primary switches having a rotatably mounted tension dial for selectively adjusting the amount of biasing force biasing the associated actuating arm towards the respective lowered position, said tension dials extending from said front face of said housing and being located on said window.

\* \* \* \* \*